(12) United States Patent
Inoue et al.

(10) Patent No.: US 7,670,444 B2
(45) Date of Patent: Mar. 2, 2010

(54) NON-HEAT TREATED STEEL FOR HOT FORGING WITH EASY FRACTURE SPLITTING

(75) Inventors: Koichiro Inoue, Suita (JP); Sadayuki Nakamura, Mie-ken (JP); Kouji Itakura, Fujisawa (JP); Yoshio Okada, Atsugi (JP); Noriyuki Shiwaku, Tokyo (JP); Jun Yoshida, Yokohama (JP); Tomonori Miyazawa, Fujisawa (JP); Hideaki Ohtaka, Kawasaki (JP); Hidetoshi Satou, Yokohama (JP); Wataru Naitou, Yokohama (JP)

(73) Assignees: Daido Steel Co., Ltd., Aichi-ken (JP); Nissan Motor Co., Ltd., Kanagawa-ken (JP)

( * ) Notice: Subject to any disclaimer, the term of this patent is extended or adjusted under 35 U.S.C. 154(b) by 93 days.

(21) Appl. No.: 10/101,010

(22) Filed: Mar. 20, 2002

(65) Prior Publication Data

US 2003/0098095 A1  May 29, 2003

(30) Foreign Application Priority Data

Mar. 21, 2001 (JP) ............................. 2001-081319

(51) Int. Cl.
*C22C 38/00* (2006.01)
(52) U.S. Cl. .................. 148/320; 148/333; 148/649
(58) Field of Classification Search ................. 148/320, 148/333, 649
See application file for complete search history.

(56) References Cited

FOREIGN PATENT DOCUMENTS

| EP | 0 779 175 A1 | 6/1997 |
|---|---|---|
| GB | 2 320 308 A | 6/1998 |
| JP | 1-176055 | 7/1989 |
| JP | 401176055 | * 7/1989 |
| JP | 403183739 | * 8/1991 |
| JP | 8-291373 | 11/1996 |
| JP | 9-268345 | 10/1997 |
| JP | 09310146 | * 12/1997 |
| JP | 10-168540 | 6/1998 |
| JP | 411279698 | * 10/1999 |
| WO | WO 99/46420 A | 9/1999 |

OTHER PUBLICATIONS

Dieter Jr., George E., Mechanical Metallurgy, McGraw-Hill Book Company, 1961, pp. 370-393.*
Dieter Jr., George E., Mechanical Metallurgy, McGraw-Hill Book Company, 1961, pp. 190-191.*

* cited by examiner

*Primary Examiner*—Sikyin Ip
(74) *Attorney, Agent, or Firm*—Posz Law Group, PLC

(57) ABSTRACT

Disclosed is a non-heat treated steel for hot forging, particularly suitable for producing connecting rods of automobile engines. The steel consists essentially of: by weight, C: 0.3-0.8%, Si: 0.1-2.0%, Mn: 0.3-1.5%, P: 0.01-0.15%, Cr: 0-1.0%, V: 0-0.4%, Al: 0-0.05%, N: 0.005-0.03% and the balance being Fe and inevitable impurities, provided that the contents of C, Mn and Cr fulfill the following condition: $1.40[C\%]+0.28[Mn\%]+0.50[Cr\%] \geq 0.75$ Pearlite area fraction in this steel after hot forging is 50% or more. Notches are provided with laser beam on an intermediate part at the location from which fracture starts, and load is applied. Then, the intermediate is split to be two components (big end or cap and small end/rod for connecting rod). The components are adhered to form the parts.

12 Claims, 1 Drawing Sheet

BOLT HOLES

NOTCH BY LASER (depth 1mm) OR NOTCH BY MACHINE (Kt=3.8)

NON-HEAT TREATED STEEL FOR HOT FORGING WITH EASY FRACTURE SPLITTING

BACKGROUND OF THE INVENTION

The present invention concerns a non-heat treated steel for hot forging with easy fracture splitting, which is processed by hot forging to the shape of a machine part, then split into two or more components by rupture, and used thereafter in combination to form the machine part. The invention encompasses intermediate products for the machine parts.

Machine parts such as connecting rods of automobile engines have been manufactured by the following steps: forging the material into one body of the part, necessary finishing by machining, and splitting by machine into two components, i.e., the cap or big end and the small end/rod. Splitting by a machine necessitates cut off width and requires many man-hours due to polishing after splitting. Thus, the costs for conventional production of connecting rods have been high.

As an alternative way to produce this kind of machine parts, other than the hot forging ingot steel, combination of metal powder sintering and forging may be employed. The sintering-forging itself is a complicated process, and therefore, not useful for solving the problem of the above discussed high costs.

In order to produce the connecting rods with reduced costs, there has been proposed, in addition to the use of non-heat treated steel, to carry out fracture splitting instead of machine splitting. This procedure comprises formation of a notch or notches at the location or locations of desired splitting on the forged product by machining and applying load so as to cause fracture starting from the notch or notches (Japanese Patent Disclosures Nos.9-3589. 9-176787 and 9-178785).

As the way to provide the notches as the staring points of the fracture splitting, other than the machining, various means utilizing thermal energy source such as laser beam, electron beam, plasma arc and TIG (hereinafter represented by the phrase "processing with laser") became to be employed. At the notches provided by the processing by laser, different from the simple physical notches, the parts on which the laser beam is irradiated structure of the steel changes by heat to martensite phase, and thus, generally becomes brittle and favorable for fracture splitting. Anyway, in case where the notches are provided by the processing by laser, situation of occurrence and progress of the fracture are different from those caused by the notches provided by machining, and therefore, it is desirable that the non-heat treated steel for hot forging is a steel suitable for the above discussed fracture.

On the other hand, because the machine parts prepared by hot forging of ingot steel of conventional non-heat treated steel for hot forging have considerable resilience with the hardness range of 20-32 HRC, which is usually observed in the machine parts, fracture splitting results in significant plastic deformation in the components on the fractured surfaces thereof (by formation of something like "share lips" observed at shock tests). It has been thus a problem that the fractured surfaces may not adhere exactly.

Generally, in the production of connecting rods, in order to improve accuracy of forging after hot forging, blanks receive cold coining or sizing. The cold coining or sizing, however, gives large residual strain to the processed material. For this reason, fracture splitting causes deformation as the result of releasing the residual strain. This is also a problem of no exact combination or adhesion at the combined fractured surfaces.

SUMMARY OF THE INVENTION

The general object of the present invention is to solve the above discussed problem concerning the machine parts used after fracture splitting and to provide such a non-heat treated steel for hot forging that the fracture starting at the notch given by processing with laser proceeds as desired to give fractured surfaces which have good possibility of adhesion without substantial plastic deformation at the fractured surfaces.

The specific object of the present invention is to provide intermediate products of machine parts prepared with this non-heat treated steel, especially, connecting rods of automobile engines.

These objects are achieved by the non-heat treated steel according to the present invention.

BRIEF EXPLANATION OF THE DRAWING

The attached drawings illustrate an example of a test piece for testing easiness of fracture splitting on which the present invention is applied.

DETAILED EXPLANATION OF PREFERRED EMBODIMENTS OF THE INVENTION

Figure 1:
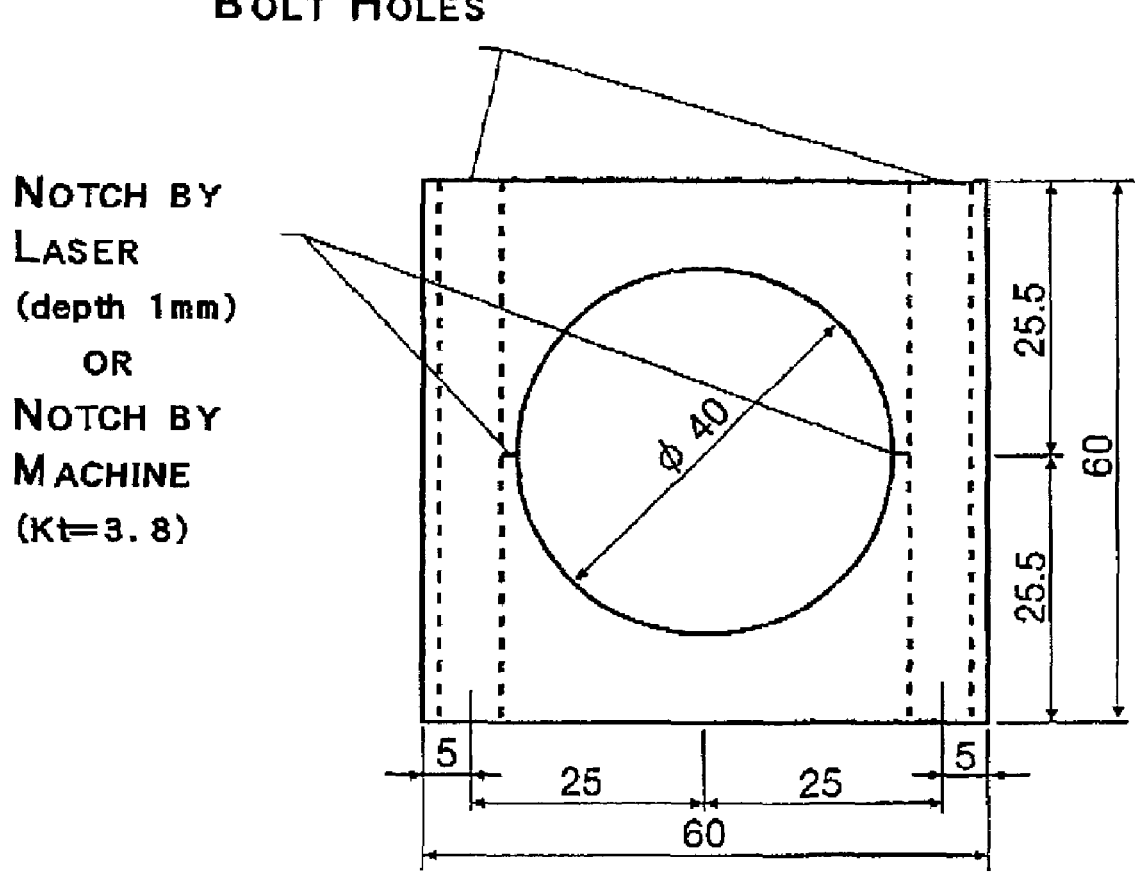
FIG. 1 is a side elevation view of the test piece.

The non-heat treated steel for hot forging, which achieves the general object of the present invention and is easily splitted by fracture, is a steel consisting essentially of: by weight, C: 0.3-0.8%, Si: 0.1-2.0%, Mn: 0.3-1.5%, P: 0.01-0.15%, Cr: 0-1.0%, V: 0-0.4%, Al: 0-0.05%, N; 0.005-0.03% and the balance being Fe and inevitable impurities, provided that the contents of C, Mn and Cr fulfill the following condition:

$$1.40\,[\text{C \%}] + 0.28[\text{Mn \%}] + 0.50[\text{Cr \%}] \geq 0.75$$

and that the pearlite area fraction after hot forging is 50% or more.

The intermediate product which achieves the specific object of the present invention is a forged product obtained by hot forging the non-heat treated steel having the above-defined alloy composition and of the shape of combination of two or more components of a machine part with notches provided by processing with laser at the points at which the parts are to be split, and, when load is applied, easily split by fracture starting from the notches. The representative products are, as mentioned above, the intermediate products for connecting rods of automobile engines.

Of the above intermediate products those subjected to hot coining or sizing for the purpose of improving forging accuracy at 600° C. or higher have little residual strain in the hot forged products, and no substantial deformation due to releasing residual strain when split by fracture.

The non-heat treated steel for hot forging according to the present invention may contain, in addition to the above-described basic alloy components, one or more of Pb: up to 0.3%, S: up to 0.2%, Ca: up to 0.1% and Bi: up to 0.3%. This alloy composition is recommended for the case where good machinability is required at the processing with machines.

The following describes the reasons for choosing the alloy composition of the present non-heat treated steel for hot forging as described above.

C: 0.3-0.8%

As mentioned above, formation of notches by processing with laser to a metal body causes quality changes in the parts which received the thermal energy. In the steel, due to rapid heating and rapid cooling, there occcurs transformation to martensite, which is a hard substance. Ductility of martensite is largely influenced by carbon content therein: at a smaller carbon content, the ductility is high, and the higher the carbon content is, the lower the ductility is. Thus, different from the physical notches, unless the carbon content is increased to a certain level, plastic deformation may occur in the components formed by splitting.

According to the inventors' experience, at a carbon content less than 0.3%, resilience of martensite is so high that the fractured surfaces could not adhere or be fitted exactly. At a higher carbon content resilience of the heat-affected zones of the notches will become low, and fracture splitting will become easier. On the other hand, hardness of the material becomes too high and the machinability decreases. The upper limit of 0.8% is thus set.

Si: 0.1-2.0%, preferably, 0.5-1.5%

Silicon is used as a deoxidizing agent at steelmaking, and increases strength of the steel by solid solution in ferrite phase Ferrite is a soft phase and this will be a main cause of plastic deformation at the fracture splitting. However, if the ferrite is hardened by sufficient amount of Si, adhesion of the fractured surfaces will be good. To ensure this effect addition of 0.1% or more of Si is necessary. At too high a Si-content hardness of the steel becomes too high and results in decreased machinability. Thus, addition of Si should be limited up to 2.0%. A preferable range is 0.5-1.5%.

Mn: 0.3-1.5%, Cr: 0-1.0%

Both manganese and chromium heighten the strength of the forged products and enhance hardenability of the steel. Particularly, Mn is an essential element from the view point of ensuring proof stress and resilience of the steel, and at least 0.3% of Mn is added for this purpose. Cr may be added or, though addition is favorable, may not be added. If Mn and/or Cr present in the steel, particularly at a higher C-content, heat-affected, brittle zones are formed at the bottom of the notches provided by processing with laser and fracture splitting will be easy. Too much addition will, however, cause formation of bainite after forging, and as the result, hardness of the steel significantly increases, which in turn decreases the machinability. Accordingly, the upper limits are set to be 1.5% for Mn, and 1.0% for Cr.

P: 0.01-0.15%

Phosphor is one of the inevitable impurities of the steel and a brittleness element, which segregates at the crystal boundaries to lower the resilience of the steel. The P-content is, therefore, usually suppressed to be as low as possible. However, for the present invention utilizing fracture splitting, for the purpose of suppressing deformation at fracture so as to improve adhesion of the fractured surfaces, phosphor is a useful element, and is added positively with the lower limit of 0.01%. The effect will, however, saturates at a higher content, and further, hot workability of the steel will be damaged. Thus, 0.3% is set as the upper limit. Suitable P-content depends on the C-content. Specifically, at the C-content of 0.4-0.5%, 0.05-0.15% of P is suitable, and at the C-content of 0.5-0.8%, 0.01-0.05% of P is suitable.

V: 0-0.4%

Vanadium forms with C and N very fine carbonitrides to enhance the strength of the steel after forging. For the non-heat treated steels, particularly, to which higher strength is required, it is considered to be usual to add V. At a higher V-content this effect saturates and the machinability decreases. Thus, 0.4% is set as the upper limit. Vanadium gives little influence on the fracture splitting utilizing the notches provided by processing with laser. If the high strength is not required, it is not necessary to add V.

Al: 0-0.05%

The steel of this kind is usually produced as aluminum-killed steel, and Al is necessarily contained in the steel. Al, in addition to the deoxidizing effect, enhances strength of the steel by formation of fine nitride particles to suppress coarsening of crystal grains during hot forging. The effect not only saturates at a higher Al-content, but also heighten the ductility to allow plastic deformation, and thus, damages the adhesion of the fractured surfaces after fracture splitting. For this reason 0.05% is decided to be the upper limit. In case where the easiness of fracture splitting is more important than the strength, no addition of Al is rather recommended.

N: 0.005-0.03%

Nitrogen is also an inevitable impurity. Conventional steel making process permits existence of N in an amount of about 0.005%. As noted in regard to Al, N has a positive role that it combines with Al to form very fine nitride particles, and that the particles prevent, through being uniformly distributed in the steel, coarsening of crystal grains during hot forging. However, too much introduction of N into the steel may cause casting defect. It is advisable to limit the addition of N to such extent that the defect is not important, i.e., up to 0.03%.

One or more of Pb: up to 0.3%, S: up to 0.2%, Ca: up to 0.1% and Bi: up to 0.3%

All the elements are machinability-improving elements, and therefore, it is recommended to add a suitable amount or amounts of one or more of Pb, S, Ca and Bi when a high machinability is required to the forged products. However, all of them are not favorable to hot workability of the steel, and the above-defined upper limits are set.

Pearlite Area Fraction: 50% or Higher

It can be generally said, as discussed above, martensite-transformation of the heat-affected zones at the bottom of the notches makes the zones brittle and facilitates the fracture. Nevertheless, processing with laser is done in a short period of time, and, though the energy-input is high, different from the ordinary quenching, carbon diffusion into the ferrite phase will not be sufficient, and thus, from the microscopic view, it is inevitable that the carbon contents are uneven depending on the location.

As also noted above, martensite of a low carbon content has a high ductility and therefore, not favorable to the fracture splitting. In the structure of low pearlite area fraction after hot forging the parts of pro-eutectoid ferrite where the carbon content is low will be transformed by processing with laser to martensite of good ductility. In this case, no merit of easiness in fracture splitting can be enjoyed. It is necessary to ensure that the pearlite area fraction is at least 50%, i.e., pearlite overwhelms martensite. When the above noted condition between the contents of C, Mn and Cr is fulfilled, the desired pearlite-rich structure will be obtained.

If hot coining or sizing at a temperature of 600° C. or higher is carried out at the hot forging, forging accuracy will be improved. Different from cold coining and sizing little stress remains in the forged products and deformation due to release of residual strain is not substantial after fracture splitting.

In the non-heat treated steel for hot forging according to the present invention, by choosing the specific alloy composition to ensure the pearlite area fraction of 50% or higher, when notches are provided by processing with thermal energy source such as laser, electron beam, plasma arc or TIG for the starting point of fracture, the heat-affected zones at the bottom of the notches are brittle and easy to split, and thus fracture proceeds satisfactorily. Plastic deformation at fracture is thus substantially zero and the fractured surfaces adhere completely. As noted, the invention is particularly useful when applied to manufacturing connecting rods of automobile engines.

EXAMPLES

The non-heat treated steels having the alloy compositions shown in TABLE 1 were prepared and cast into ingots, which were then hot forged to be forged rods of 50 mm square section.

The rods were heated to 1200° C. for 60 minutes and hot forged to round rods of diameter 22 mm. In order to simulate the processing conditions for non-heat treated steel the round rods were laid on the floor with suitable distances between them and cooled to room temperature. Test pieces were cut out from the round rods and subjected to the following tests. Testing methods are as follows:

[Hardness]
Hardness of the forged products was measured at the center of the round rods with Rockwell hardness meter.

[Pearlite Area Fraction]
Photographs of the structure were taken with an optical microscope (magnitude: 100) and treated with an image analyzer.

[Easiness in Fracture Splitting]
At the centers of the tensile test pieces prepared in accordance with JIS No.4 standard test piece having parallel part of diameter 8 mm ring-shaped notches of depth 1 mm were provided with laser. The test pieces were subjected to tensile tests at room temperature and the elongation at breaking was recorded for evaluation of the adhesion.

[Tool Life]
Drilling tests were carried out under the following conditions, and the data were expressed by relative values taking Example No. 1 as the standard, 100.
Tool: SKH51 Feed: 0.1 mm/rev.
Hole Depth: 10 mm Cutting Oil: none
Critrion of tool life: no further drilling possible

TABLE 1

| | Alloy Compositions (wt. %, balance Fe and impurities) | | | | | | | | |
|---|---|---|---|---|---|---|---|---|---|
| No. | C | Si | Mn | P | Cr | V | Al | N | Others |
| Examples | | | | | | | | | |
| 1 | 0.35 | 0.60 | 1.10 | 0.102 | 0.50 | 0.10 | 0.021 | 0.010 | — |
| 2 | 0.45 | 1.00 | 1.20 | 0.102 | 0.15 | — | 0.025 | 0.013 | — |
| 3 | 0.45 | 0.25 | 0.80 | 0.050 | 0.30 | — | 0.045 | 0.008 | — |
| 4 | 0.75 | 0.15 | 0.35 | 0.020 | — | — | — | 0.026 | — |
| 5 | 0.43 | 0.60 | 0.80 | 0.098 | 0.10 | 0.10 | 0.021 | 0.011 | — |
| 6 | 0.40 | 0.31 | 0.35 | 0.142 | 0.85 | 0.32 | 0.012 | 0.021 | — |
| 7 | 0.45 | 1.10 | 1.23 | 0.089 | 0.11 | — | 0.023 | 0.012 | Pb: 0.1 |
| 8 | 0.46 | 0.82 | 1.21 | 0.102 | 0.10 | — | 0.021 | 0.011 | S: 0.05 Pb: 0.1 |
| 9 | 0.45 | 1.00 | 1.25 | 0.103 | 0.10 | — | 0.005 | 0.013 | S: 0.05 Ca: 0.002 |
| 10 | 0.45 | 1.11 | 1.20 | 0.102 | 0.10 | — | 0.005 | 0.015 | S: 0.05 Ca: 0.0018 Bi: 0.05 |
| Controls | | | | | | | | | |
| A | 0.25 | 1.20 | 1.10 | 0.130 | 0.50 | — | 0.021 | 0.011 | — |
| B | 0.85 | 0.25 | 0.80 | 0.030 | 0.30 | — | 0.012 | 0.008 | — |
| C | 0.55 | 2.50 | 1.20 | 0.120 | 0.60 | — | 0.027 | 0.009 | — |
| D | 0.48 | 1.01 | 1.80 | 0.103 | 0.30 | — | 0.019 | 0.014 | — |
| E | 0.52 | 0.82 | 0.81 | 0.061 | 1.21 | — | 0.021 | 0.009 | — |
| F | 0.50 | 1.00 | 1.23 | 0.180 | 0.10 | — | 0.022 | 0.018 | — |
| G | 0.55 | 0.90 | 1.11 | 0.050 | 0.52 | 0.45 | 0.020 | 0.021 | — |
| H | 0.46 | 1.01 | 1.21 | 0.110 | 0.15 | — | 0.023 | 0.045 | — |
| I | 0.55 | 1.10 | 1.00 | 0.050 | 0.10 | — | 0.021 | 0.021 | S: 0.10 Pb: 0.35 |
| J | 0.46 | 1.29 | 1.18 | 0.098 | 0.21 | — | 0.022 | 0.018 | S: 0.05 Bi: 0.38 |
| K | 0.40 | 1.54 | 0.42 | 0.103 | 0.11 | 0.11 | 0.021 | 0.015 | — |
| Conventional Steel | | | | | | | | | |
| L | 0.40 | 0.25 | 0.80 | 0.015 | 0.10 | 0.10 | 0.025 | 0.008 | — |

The results are shown in TABLE 2.

TABLE 2

Test Results

| No. | Pearlite Area Percentage (%) | Hardness (HRC) | Elongation at Breaking (mm) | Drilling Efficiency | Remarks |
|---|---|---|---|---|---|
| Examples | | | | | |
| 1 | 75 | 20.2 | 0.04 | 325 | |
| 2 | 75 | 22.2 | 0.00 | 100 | |
| 3 | 86 | 22.7 | 0.00 | 98 | |
| 4 | 100 | 25.4 | 0.00 | 83 | |
| 5 | 59 | 21.3 | 0.02 | 112 | |
| 6 | 79 | 31.7 | 0.00 | 51 | |
| 7 | 74 | 22.4 | 0.00 | 275 | |
| 8 | 74 | 22.1 | 0.00 | 460 | |
| 9 | 73 | 22.1 | 0.00 | 380 | |
| 10 | 75 | 20.8 | 0.21 | 720 | |
| Controls | | | | | |
| A | 68 | 19.8 | 0.42 | 420 | |
| B | 100 | 35.4 | 0.00 | 32 | |
| C | 100 | 34.8 | 0.00 | 41 | |
| D | — | 42.3 | 0.00 | 25 | bainite formed |
| E | — | 40.1 | 0.00 | 27 | bainite formed |
| F | — | — | — | — | broken at forging |
| G | 100 | 47.8 | 0.00 | 12 | |
| H | — | — | — | — | casting defect |
| I | — | — | — | — | broken at forging |
| J | — | — | — | — | broken at forging |
| K | 49 | 22.1 | 0.31 | — | |
| Conventional Steel | | | | | |
| L | 55 | 20.3 | 1.25 | — | |

In Examples 1-9 elongation at break is at a substantially negligible level, or zero to very small value, even if any, with the practical hardness or HRC 20-23. In other words, adhesion of the fractured surfaces is complete. The steels of Examples 5-9 containing machinability-improving element or elements exhibit remarkably improved drilling efficiency.

On the contrary, in Control A due to low C-content and resulting large elongation at breaking, adhesion of the fractured surfaces are not good. Controls B and C, in which the respective amounts of C and Si are too high, have poor machinability. Both Controls D and E contain too much Mn or Cr, and have no practical use because of very high hardness after forging due to formation of bainite and low machinability. Control F containing too much P was broken at forging. Control G of too high a V-content is hard and exhibits no good machinability. Control H suffered from ingot defect due to high N-content even at casting. In Controls I and J contents of machinability-improving elements are too high, and thus, the blanks were broken at forging. Alloy composition of Control K does not fulfill the above noted condition (the value of the equation concerning the contents of C, Mn and Cr is 0.733, less than 0.75 set forth above), and due to the resulting insufficient pearlite area fraction, elongation at breaking is too large.

The Conventional steel is a known material for connecting rods which is not processed by fracture splitting. Elongation at breaking of this steel is large when compared with the Examples.

Separate to the above-described working examples the rods of 50 mm square in Examples 2 and 4 and Conventional Steel L were forged at 1200° C. to plates having a section of thickness 20 mm and width 65 mm. The forged plates were laid on the floor with suitable distances between them and cooled to room temperature. To simulate hot coining reduction of 10% was given to the plates in the direction of thickness at 700° C. For comparison, as the simulation to cold coining, also reduction of 10% was given to the plates in the direction of thickness at room temperature.

Figure 2:
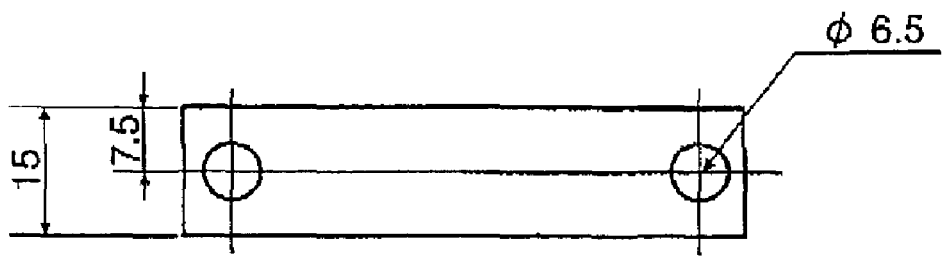
FIG. 2, a plan view.

Test pieces were prepared by using these materials having the shape of FIG. 1 and FIG. 2 with simulation to the big end of a connecting rod, on the half of them notches with stress-concentration factor (Kt) 3.8 were given mechanically, and on the rest notches of 1 mm deep were given by processing with laser. These two groups of test pieces were subjected to fracture splitting by applying load at room temperature. The two components obtained by fracture splitting were combined and tied with bolts at a torque of 29.4N·m. Roundness of the tied bodies was measured and shown in TABLE 3. The roundness of the test pieces before separation was 3 μm or less for all the samples.

TABLE 3

Roundness Measurement

| | Mechanical Notch | | Laser Notch | |
|---|---|---|---|---|
| Coining | Cold | Hot | Cold | Hot |
| Example 2 (μm) | 52.1 | 42.1 | 36.3 | 25.3 |
| Example 4 (μm) | 32.3 | 25.8 | 27.8 | 20.2 |
| Conventional L (μm) | no fracture | | 120.2 | 92.4 |

From the above results it is concluded that the steel of the present invention gives, even if the notches are provided mechanically, superior roundness after fracture splitting when compared with a conventional steel, and those with notches provided with processing with laser give much better roundness. Further, it is concluded that, according to the invention, even with the cold coining which is practiced for improving forging accuracy of the connecting rods, the roundness after fracture splitting is good, and thus, adhesion of the components of the part is good. In cases where hot coining is applied to the present steel for improving the forging accuracy, roundness after fracture splitting is very good, in comparison with the cases of cold coining, and excellent adhesion can be enjoyed.

We claim:

1. A non-heat treated and hot forged steel product having easy fracture splitting, consisting essentially of: by weight, C: 0.3-0.46%, Si: 0.5-2.0%, Mn: 0.3-1.5%, P: 0.05-0.15%, Cr: 0-1.0%, V: 0-0.4%, Al: 0-0.05%, N: 0.005-0.03% and the balance being Fe and inevitable impurities, provided that:
   (1) the contents of C, Mn and Cr fulfill the following condition:

$$1.40(C\%) + 0.28(Mn\%) + 0.50(Cr\%) \geq 0.75$$

(2) the pearlite area fraction is 50% or more, and
   (3) the shape of the product being a combination of two or more components of a machine part with a notch or notches provided by processing with a thermal source that increases brittleness of the non-heat treated and hot forged steel product at bottom portions of the notch or notches, the thermal source being selected from the group consisting of laser, electron beam, plasma arc, TIG, and equivalents thereof; the product being easily split by fracture upon application of load, whereby fracturing starts from the notch or notches to separate the two or more components into distinct parts, wherein forging accuracy is improved by hot coining or hot sizing during the hot forging at a temperature of 600° C. or higher.

2. A non-heat treated and hot forged steel product according to claim 1, further consisting essentially of: one or more of Pb: up to 0.3%, S: up to 0.2%, Ca: up to 0.1% and Bi: up to 0.3.

3. A non-heat treated and hot forged steel product according to claim 2, wherein the two or more components of a machine part are the big end part and the small end/rod part of a connecting rod of an internal combustion reciprocal engine.

4. A non-heat treated and hot forged steel product according to claim 1, wherein the two or more components of a machine part are the big end part and the small end/rod part of a connecting rod of an internal combustion reciprocal engine.

5. A component steel product prepared by:

hot forging a steel product consisting essentially of: by weight, C: 0.3-0.46%, Si: 0.5-2.0%, Mn: 0.3-1.5%, P: 0.05-0.15%, Cr: 0-1.0%, V: 0-0.4%, Al: 0-0.05%, N: 0.005-0.03% and the balance being Fe and inevitable impurities, provided that:

(1) the contents of C, Mn and Cr fulfill the following condition:

$$1.40(C\%)+0.28(Mn\%)+0.50(Cr\%) \geq 0.75, \text{ and}$$

(2) the pearlite area fraction of the forged steel product is 50% or more;

notching the forged steel product with a notch or notches into a combination of two or more components of a machine part by processing with a thermal source that increases brittleness of the non-heat treated and hot forged steel product at bottom portions of the notch or notches, the thermal source being selected from the group consisting of laser, electron beam, plasma arc, TIG, and equivalents thereof; and splitting the notched steel product by fracturing the notched steel product into the two or more components of a machine part upon application of load to the notched steel product and separating the notched steel product beginning from the notch or notches into the two or more components of a machine part that are distinct from one another and include the component steel product, wherein forging accuracy is improved by hot coining or hot sizing during the hot forging at a temperature of 600° C. or higher.

6. A component steel product according to claim 5, further consisting essentially of: one or more of Pb: up to 0.3%, S: up to 0.2%, Ca: up to 0.1% and Bi: up to 0.3.

7. A component steel product according to claim 6, wherein the two or more components of a machine part are the big end part and the small end/rod part of a connecting rod of an internal combustion reciprocal engine.

8. A component steel product according to claim 5, wherein the two or more components of a machine part are the big end part and the small end/rod part of a connecting rod of an internal combustion reciprocal engine.

9. A non-heat treated and hot forged steel product having easy fracture splitting, consisting essentially of: by weight, C: 0.3-0.46%, Si: 0.5-2.0%, Mn: 0.3-1.5%, P: 0.05-0.15%, Cr: 0-1.0%, V: 0-0.4%, Al: 0-0.05%, N: 0.005-0.03% and the balance being Fe and inevitable impurities, provided that:

(1) the contents of C, Mn and Cr fulfill the following condition:

$$1.40(C\%)+0.28(Mn\%)+0.50(Cr\%) \geq 0.75$$

(2) the pearlite area fraction is 50% or more, and (3) the shape of the product being a combination of two or more components of a machine part with a notch or notches provided by processing with a thermal source selected from the group consisting of laser, electron beam, plasma arc, TIG, and equivalents thereof; the product being easily split by fracture upon application of load, and bottom portions of the notches having an elongation at break of at most 0.04 mm, whereby fracturing starts from the notch or notches to separate the two or more components into distinct parts, wherein forging accuracy is improved by hot coining or hot sizing during the hot forging at a temperature of 600° C. or higher.

10. A non-heat treated and hot forged steel product according to claim 9, further consisting essentially of: one or more of Pb: up to 0.3%, S: up to 0.2%, Ca: up to 0.1% and Bi: up to 0.3.

11. A non-heat treated and hot forged steel product according to claim 10, wherein the two or more components of a machine part are the big end part and the small end/rod part of a connecting rod of an internal combustion reciprocal engine.

12. A non-heat treated and hot forged steel product according to claim 9, wherein the two or more components of a machine part are the big end part and the small end/rod part of a connecting rod of an internal combustion reciprocal engine.

* * * * *